United States Patent [19]
Guerin

[11] Patent Number: 5,546,201
[45] Date of Patent: Aug. 13, 1996

[54] DOUBLE BOUNCE PASSIVE FACET TRACKING WITH A REFLECTIVE DIFFRACTION GRATING ON A FLAT FACET

[75] Inventor: Jean-Michel Guerin, Glendale, Calif.

[73] Assignee: Xerox Corporation, Stamford, Conn.

[21] Appl. No.: 359,503

[22] Filed: Dec. 20, 1994

[51] Int. Cl.⁶ .................... G02B 5/18; G02B 26/10; G02B 26/12
[52] U.S. Cl. .................. 359/17; 359/203; 359/217; 359/566; 359/571; 359/572
[58] Field of Search ............... 359/17, 18, 216, 359/217, 566, 571, 572, 203; 250/237 G

[56] References Cited

U.S. PATENT DOCUMENTS

| | | | |
|---|---|---|---|
| 3,419,330 | 12/1968 | Schneider | 359/570 |
| 3,614,193 | 10/1971 | Beiser | 359/572 |
| 3,688,570 | 9/1972 | Burke, Jr. | |
| 3,721,487 | 3/1973 | Pieuchard et al. | 359/17 |
| 3,804,485 | 4/1974 | Clarke | 359/216 |
| 4,170,028 | 10/1979 | DeBenedictis et al. | 359/217 |
| 4,205,348 | 5/1980 | DeBenedictis et al. | 359/217 |
| 4,290,696 | 9/1981 | Mould et al. | 359/572 |
| 4,304,459 | 12/1981 | Kramer | 359/216 |
| 4,544,228 | 10/1985 | Rando | 359/17 |
| 4,751,383 | 6/1988 | Ueyama | 250/237 G |
| 4,978,184 | 12/1990 | Straayer | 359/216 |
| 4,987,299 | 1/1991 | Kobayashi et al. | 250/231.14 |
| 5,291,318 | 3/1994 | Genovese | 359/572 |

FOREIGN PATENT DOCUMENTS

| | | | |
|---|---|---|---|
| 55-77716 | 6/1980 | Japan | 359/17 |
| 58-117518 | 7/1983 | Japan | 359/17 |
| 2-189512 | 7/1990 | Japan | 359/17 |
| 3-85512 | 4/1991 | Japan | 359/17 |
| 1656488 | 6/1991 | U.S.S.R. | 359/17 |

Primary Examiner—Jon W. Henry
Attorney, Agent, or Firm—Nola Mae McBain

[57] ABSTRACT

A double bounce facet tracking polygon in which a reflective mode replicated diffraction grating element on a flat facet on the double bounce facet tracking polygon is used to provide a small angle deflection which is used in a passive facet tracking system.

15 Claims, 6 Drawing Sheets

DOUBLE BOUNCE PASSIVE FACET TRACKING WITH A REFLECTIVE DIFFRACTION GRATING ON A FLAT FACET

BACKGROUND OF THE INVENTION

This invention relates to a double bounce passive facet tracking system and more particularly to a method which uses a reflective diffraction grating on a flat facet of a rotating polygon assembly instead of a dual mirror rotating polygon assembly using convex and flat mirrors.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well established and refined process. Until recently, the problems with diffraction and fabricating high efficiency diffractive elements have made diffractive elements infeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, on axis diffractive phase elements can achieve 100 percent diffraction efficiency. To achieve this efficiency, however, a continuous phase surface profile is necessary. The theoretical diffraction efficiency of this surface profile is also relatively sensitive to a change in wavelength. By contrast, refractive elements are wavelength insensitive, with respect to throughput, over most of the transmission band.

However, simple diffractive elements can be designed for use in systems, such as printing and copying systems, which use a single wavelength of light and require only simple beam changes. One advantage of using simple diffractive optical elements is that diffractive optical elements are generally smaller, thinner and lighter, reducing size and weight of an overall optical system. A second advantage of using simple diffractive optical elements is that they may be fabricated using simple stamping or pressing manufacturing techniques once a master has been made, reducing manufacturing costs.

Conventional facet tracking deflection, as shown in FIG. 1, has been provided through a first bounce of a focused beam on a convex facet 6 residing above (or below, depending on design choice) a flat facet 4 of a dual rotating polygon 2. This convex facet 6 imparts a small angle of deflection needed to the focused beam, i.e. roughly 1.5×beam divergence, so that its travel through a dual pass Fourier transform lens will bring it back collimated and centered on the flat facet 4 below from start of scan through end of scan. This configuration is well known in the art. Although currently projected to cost much less than an acoustooptic deflector, the second polygon with the convex facets registered properly with respect to a standard polygon will add mass and size to the overall polygon resulting in, among other things, slower rotation speeds.

It is an object of this invention to provide a double bounce passive facet tracking system and more particularly to provide a reflective diffraction grating on a flat facet of a rotating polygon assembly instead of a dual mirror rotating polygon assembly, using convex and flat mirrors, thereby reducing the weight and size of a rotating polygon assembly.

SUMMARY OF THE INVENTION

Briefly stated and in accordance with the present invention, there is provided a rotating polygon having an axis of rotation and at least one facet. The facet has a reflective mode replicated diffraction grating element on it. The reflective mode replicated diffraction grating element extends approximately parallel to one edge of the facet and extends in a direction generally transverse to the axis of rotation.

Also provided is a passive facet tracking system using the rotating polygon with the reflective mode replicated diffraction grating element on it in conjunction with a lens and a mirror.

BRIEF DESCRIPTION OF THE DRAWINGS

While the present invention will be described in connection with a preferred embodiment and method of use, it will be understood that it is not intended to limit the invention to that embodiment/procedure. On the contrary, it is intended to cover all alternatives, modifications and equivalents as may be included within the spirit and scope of the invention as defined by the appended claims.

| ALPHA-NUMERIC LIST OF ELEMENTS | |
| --- | --- |
| F | effective focal length |
| P | pitch |
| W | width |
| $\alpha$ | cosine offset angle |
| $\Delta$ | translational distance |
| $\delta$ | blazing angle |
| $\Phi$ | facet tracking deflection amplitude angle |
| $\Phi_{max}$ | maximum facet tracking deflection amplitude angle |
| $\eta$ | beam reflection angle |
| $\theta$ | polygon rotation angle |

-continued

ALPHA-NUMERIC LIST OF ELEMENTS

| | |
|---|---|
| 2 | dual scanning polygon |
| 4 | flat facet |
| 6 | convex facet |
| 8 | axis of rotation |
| 10 | double bounce facet tracking polygon |
| 12 | reflective mode replicated diffraction grating element |
| 14 | flat facet |
| 20 | fourier transform lens |
| 22 | mirror |
| 24 | facet tracking system |
| 26 | incoming beam |
| 28 | reflected beam |
| 30 | beam |
| 34 | grooves |
| 40 | normal line |
| 42 | COS line |
| 44 | normal line |

DETAILED DESCRIPTION OF THE INVENTION

Figure 1:
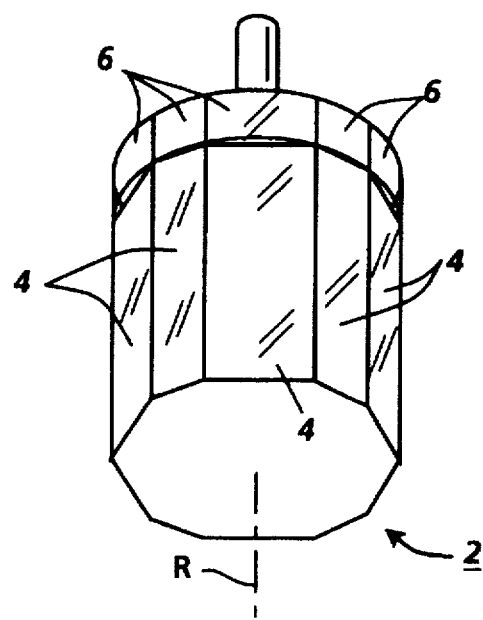
FIG. 1 is a perspective view of a prior art dual rotating polygon with both flat and curved facets.
Figure 2:
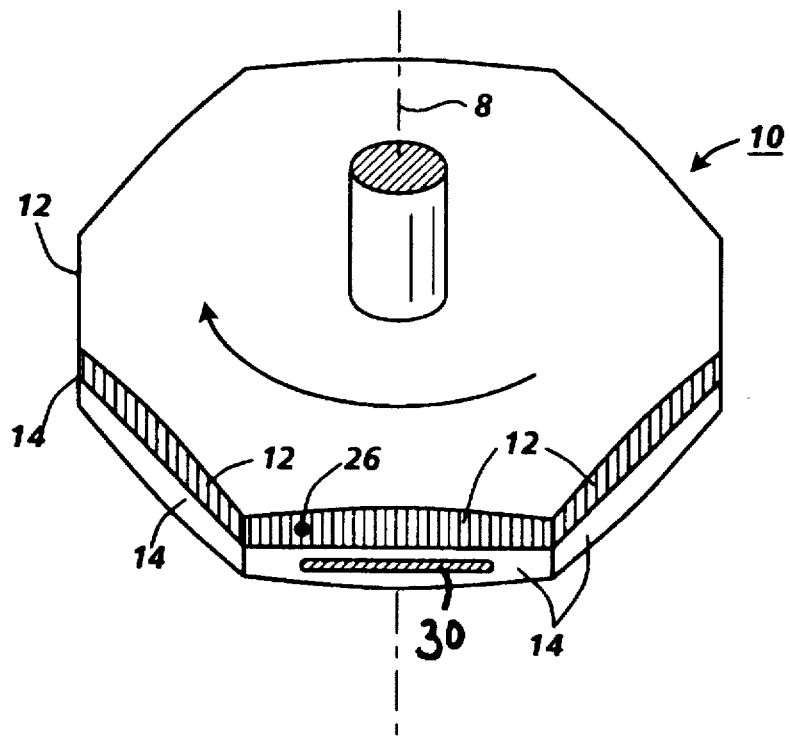
FIG. 2 is a schematic illustration of a double bounce facet tracking polygon with a reflective mode replicated diffraction grating element.

I. Invention:

Turning now to FIG. 2 an implementation of a double bounce facet tracking polygon 10 with a reflective mode replicated diffraction grating element 12 on a standard flat facet 14 is shown. The double bounce facet tracking polygon 10 has an axis of rotation 8. The reflective mode replicated diffraction grating element 12 runs parallel to an edge of the flat facet 14 which is generally transverse to the axis of rotation 8. This reflective mode replicated diffraction grating element 12 removes the need for an extra polygon with convex facets 6 as shown in FIG. 1. Additionally, the amount of sagittal offset needed is reduced.

As shown on FIG. 2, an incoming beam 26 is focused onto the polygon facet, in this example between start of scan and center of scan. Due to design constraints of double bounce facet tracking, a small focused beam at the first bounce provides a large scan efficiency, and provides small enough focal lengths for a Fourier transform lens. The returned beam 30 is shown centered on the flat facet 14.

Figure 3:
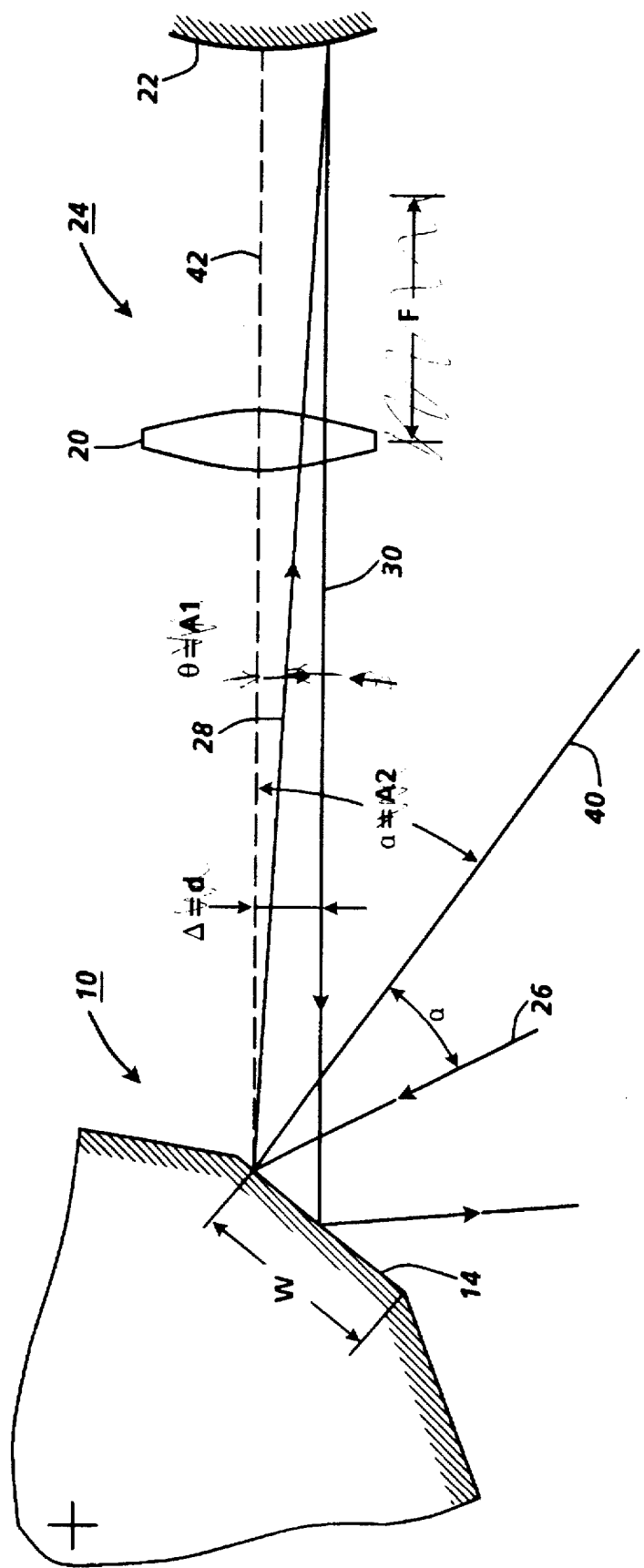
FIG. 3 is a facet tracking system using the double bounce facet tracking polygon with the reflective mode replicated diffraction grating element shown in FIG. 2 with the polygon in a start of scan position.
Figure 4:
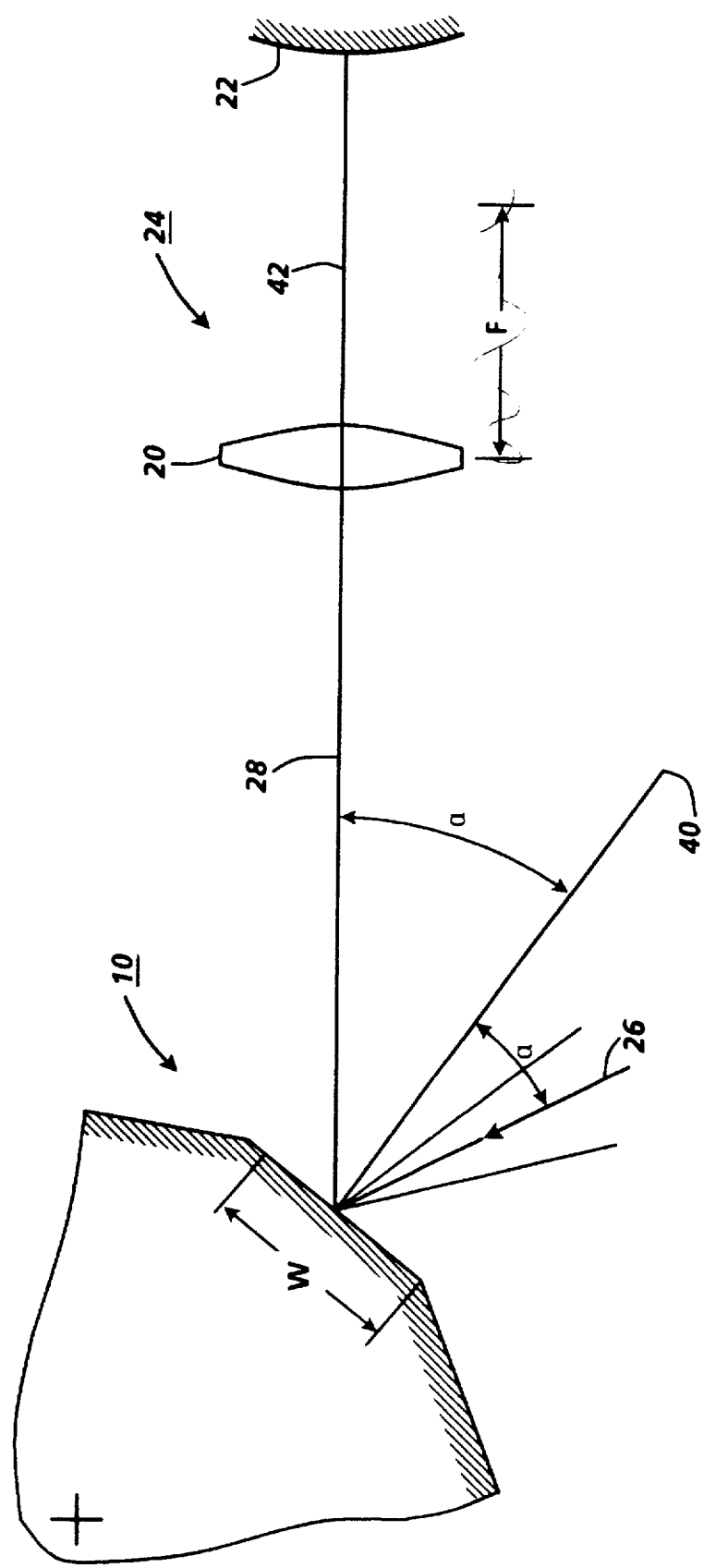
FIG. 4 is the facet tracking system using the double bounce facet tracking polygon with the reflective mode replicated diffraction grating element shown in FIG. 2 with the polygon in a center of scan position.
Figure 5:
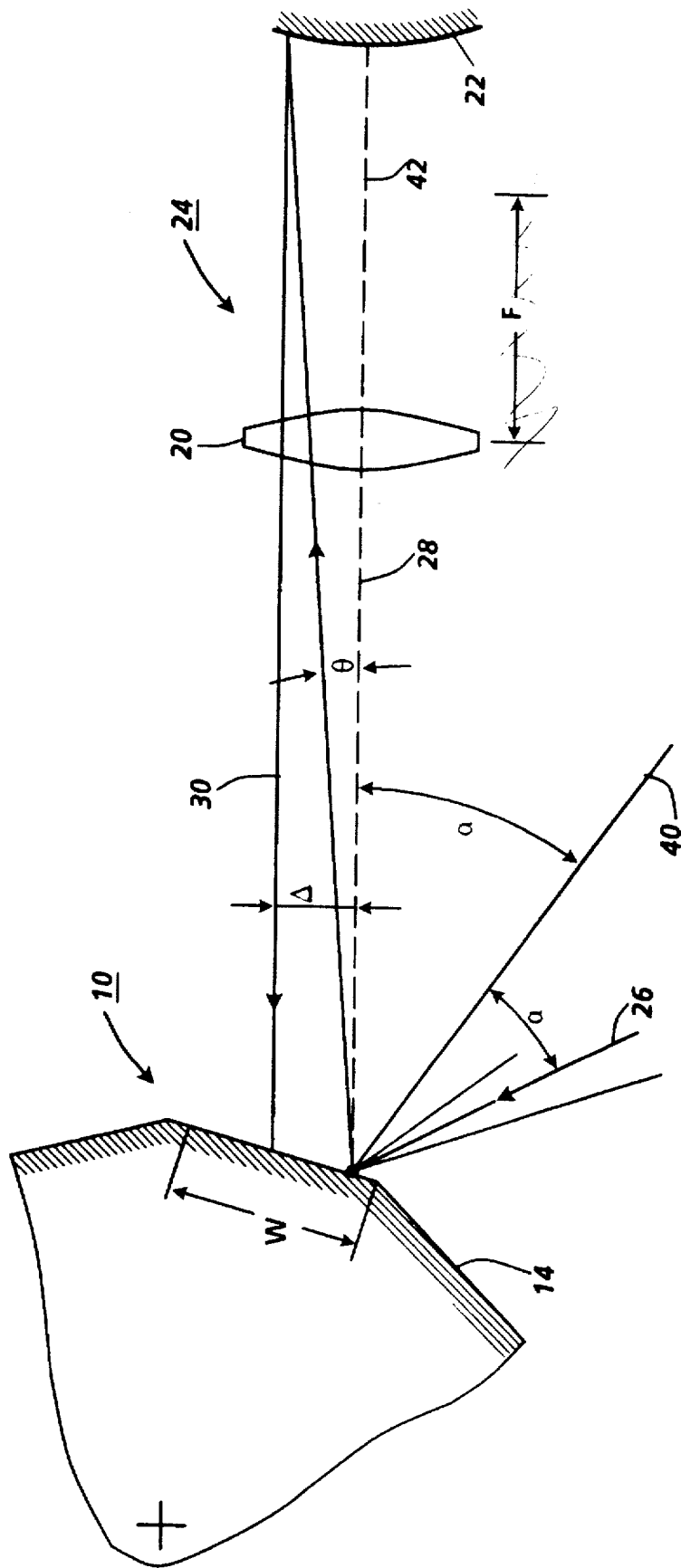
FIG. 5 is the facet tracking system using the double bounce facet tracking polygon with the reflective mode replicated diffraction grating element shown in FIG. 2 with the polygon in an end of scan position.

FIGS. 3-5 show a tangential plane view of a facet tracking system 24 using the double bounce facet tracking polygon 10 along with a fourier transform lens 20 and a mirror 22. FIG. 3 shows the facet tracking system 24 where the incoming beam 26 is in a start of scan position. FIG. 4 shows the facet tracking system 24 when the incoming beam 26 is in a center of scan position and FIG. 5 shows the facet tracking system 24 when the incoming beam 26 is in an end of scan position. In each of FIGS. 3-5 the incoming beam 26 is reflected by the double bounce facet tracking polygon 10. The reflected beam 28 then passes through the fourier transform lens 20 before it is received by the mirror 22. The beam 30 reflected from the mirror 22 then passes again through the fourier transform lens 20 before being received by the double bounce facet tracking polygon 10. When the beam 30 is received by the double bounce facet tracking polygon 10 it has been sagittally displaced and is received in the center of the flat facet 14 regardless of whether the beam 30 is in a start of scan, center of scan or end of scan position.

Figure 6:
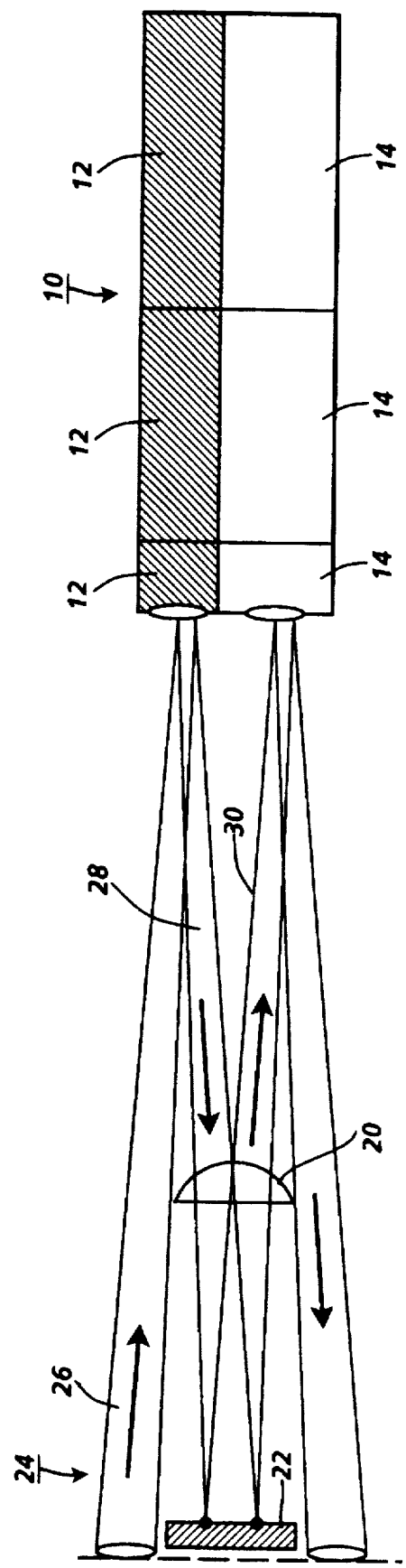
FIG. 6 is a sagittal view of the facet tracking system using the double bounce facet tracking polygon with the reflective mode replicated diffraction grating element shown in FIG. 2.

FIG. 6 shows the facet tracking system 24 in a sagittal plane view. The incoming beam 26 is received by the reflective mode replicated diffraction grating element 12 and reflected beam 28 passes through the fourier transform lens 20 before being received by the mirror 22. The mirror 22 reflects beam 30 back through the fourier transform lens 20 to the flat facet 14.

The reflective mode replicated diffraction grating element 12 is a reflective grating and could be a UV cured epoxy film replicated off a master, bonded to a prior art aluminum diamond-turned facet. Alternatively, depending on the practicality of plastic-molded polygons, the reflective mode replicated diffraction grating element 12 may be part of the molding process.

An analysis of dimensions of the reflective mode replicated diffraction grating element 12 shows that blazing angles of individual grating groove surfaces with respect to the facet vary linearly with polygon rotation. Pitch remains nearly constant but does vary somewhat.

II. Analysis

Figure 7:
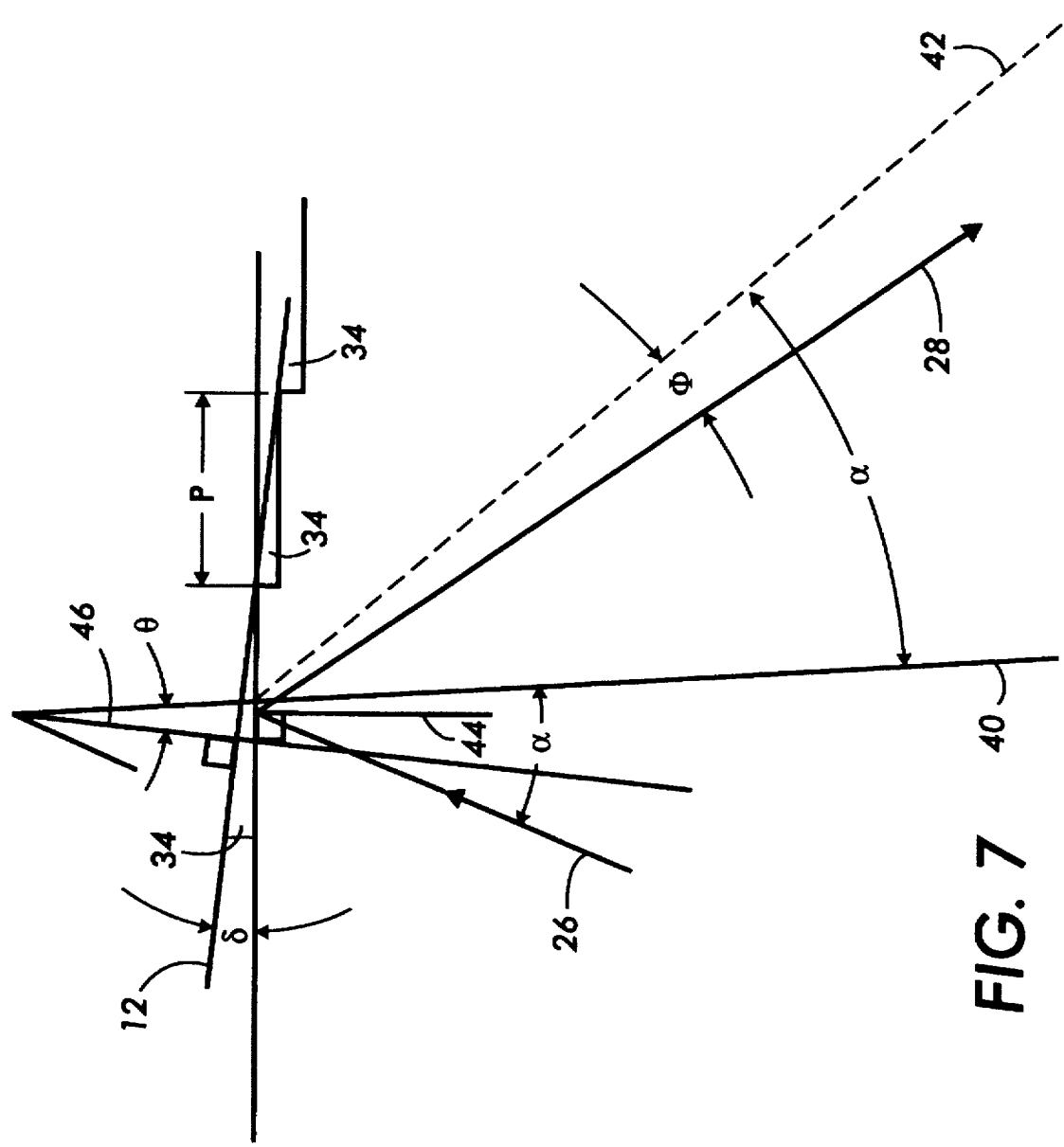
FIG. 7 is a detailed drawing of the reflective mode replicated diffraction grating element on the double bounce facet tracking polygon of FIG. 2 with the polygon in a position between start of scan and center of scan.

The reflective mode replicated diffraction grating element 12 comprises a series of grooves 34 separated by a pitch P and having a blazing angle $\delta$ as shown in FIG. 7. A first order analysis of the blazing angle relationship $\delta(\theta)$ of the reflective mode replicated diffraction grating element 12 groove 34 with respect to the polygon rotation angle $\theta$ and the pitch relationship $P(\theta)$, across the facet as a function of the rotation angle $\theta$ of the polygon is provided. It will be shown that the blazing angle $\delta$ is linear with respect to the polygon rotation angle $\theta$ and the pitch P varies very little with the polygon rotation angle $\theta$.

In FIGS. 3-5, line 40, is a perpendicular line to the face of the flat facet 14 when the flat facet 14 is in a center of scan position. COS line 42 is the path that the beam 30 would take if the flat facet 14 were in the center of scan position. There is a facet tracking deflection amplitude angle $\Phi$ and a translational distance $\Delta$ measured between the reflected beam 28 and the COS line 42. A cosine offset angle $\alpha$ is measured from the normal line 40. The flat facet 14 has a width W. The double bounce facet tracking polygon 10 has a total number of facets n and the fourier transform lens 20 has an effective focal length F.

In a first order approximation the following equations apply:

The translational distance $\Delta$ of the beam 30 to the COS line 42 and the average facet size projection both equal the width W divided by the cosine of the cosine offset angle a which is expressed by the equation:

$$\Delta = W/\cos \alpha. \tag{1}$$

If the $1/e^2$ spot diameter, which is measured where the beam intensity drops to $1/e^2$, of the incoming beam is $2r_p$, at the photoreceptor, as required by system requirements of the double bounce facet tracking polygon 10 and resolution requirements of a photoreceptor, then a truncation ratio a can be defined to relate spot size to facet size that is:

$$(W \cos \alpha)/2r_p = a. \tag{2}$$

Defining $r_1$ as the $1/e^2$ spot diameter of the incoming beam 26 at the first bounce then the translational distance $\Delta$ is equal to the effective focal length F multiplied by the facet tracking deflection amplitude angle $\Phi$ or $$\Delta = F\Phi \tag{3}$$

and $$r_p = \lambda F/\pi r_1 \tag{4}$$

where $\lambda$ equals the wavelength of light.

Substituting the relationship for the translational distance $\Delta$ in equation (1) into equation (3), the new equation can be solved for:

$$\Phi = W/F \cos \alpha. \tag{5}$$

Substituting equation (2) into equation (4) and solving for $r_1$ produces:

$$r_1 = 2\lambda F a/\pi W \cos \alpha \tag{6}$$

As the double bounce facet tracking polygon 10 rotates, the flat facet 14 rotates through a maximum facet tracking deflection amplitude angle $\Phi_{max}$ as the the flat facet 14 rotates from the start of scan position to the end of scan position. The facet tracking deflection amplitude angle $\Phi$ shown in FIGS. 2 and 4 is therefore equal to ½ the maximum facet tracking deflection amplitude angle $\Phi_{max}$. The maximum facet tracking deflection amplitude angle $\Phi$max is also equal to the maximum deflection angle from equation (5) or $$\Phi_{max} = Wf/F \cos \alpha. \tag{7}$$

where f is a scanning efficiency factor.

Turning now to FIG. 7, the incoming beam 26 is shown impacting the reflective mode replicated diffraction grating element 12 on the flat facet 14 with the double bounce facet tracking polygon 10 rotated so that the flat facet 14 is between a start of scan position and a center of scan position. The double bounce facet tracking polygon 10 is rotated by a polygon rotation angle θ measured with respect to normal line 46 which is perpendicular to the flat facet 14. A normal line 44 is drawn perpendicular to the groove 34 and a beam reflection angle η is measured with respect to the normal line 44. The beam reflection angle η is the cosine offset angle $\alpha$ plus the facet tracking deflection amplitude angle $\Phi$ plus the polygon rotation angle θ or $$\eta = \alpha + \delta + \theta. \tag{8}$$

Applying equation (8) to a first order approximation we know that the beam reflection angle 2η must be twice the maximum cosine offset angle $\alpha_{max}$ minus one-half the maximum facet tracking deflection amplitude angle $\Phi_{max}$ at the start of scan position and twice the maximum cosine offset angle $\alpha_{max}$ plus one-half the maximum facet tracking deflection amplitude angle $\Phi_{max}$ at the end of scan position which is represented by equations (9) and (10).

$$\eta_{sos} = 2\alpha - (\Phi_{max}/2) \tag{9}$$

$$\eta_{eos} = 2\alpha + (\Phi_{max}/2) \tag{10}$$

From these equations (7), (9), and (10) it can be shown that facet tracking deflection amplitude angle $\Phi$ must have a linear expression in the form of $$\Phi = c\theta + d \tag{11}$$

where c and d are constants. Using equations (7), (9), (10), and (11) and substituting and solving for the constants c and d produces the following equation for the facet tracking deflection amplitude angle $\Phi$ $$\Phi = W/(4F \cos \alpha)[(N/\pi)\theta - f] \tag{12}$$

where f is a scan efficiency factor.

Equation (12) represents the desired reflection from the reflective mode replicated diffraction grating element 12.

Using equation (8) and equation (12) a first order approximation for the blazing angle $\delta$ as a function of polygon rotation angle θ can be derived as:

$$\delta = [WN/(8\pi F \cos \alpha) - 1]\theta - Wf/(8\pi F \cos \alpha). \tag{13}$$

From this equation it is obvious that the blazing angle $\delta$ varies linearly with respect to the polygon rotation angle θ.

Returning to FIG. 7, the incoming beam 26 is also a plane wave which is incident on the reflective mode replicated diffraction grating element 12. The net reflection angle which is twice the beam reflection angle η must be equal to the incident angle plus the reflected beam 28 angle. This can be represented by the equation:

$$2(\alpha + \theta + \delta) = (\alpha + \theta) + (\alpha + \theta + 2\delta) \tag{14}$$

The first order grating equation that the incident beam must obey is:

$$\sin \theta_{out} = \lambda/p - \sin \theta_{inc} \tag{15}$$

Using equations (14) and (15) a first order approximation for the pitch P as a function of polygon rotation angle θ can derived as:

$$p = \lambda/[\sin (\alpha + \theta + 2\delta) + \sin (\alpha + \theta)] \tag{16}$$

Using equations (13) and (16) for the blazing angle $\delta$ and the pitch P as a function of the polygon rotation angle θ and working out real numbers for an example such as a double bounce facet tracking polygon 10 with 18 flat facets 14 and a polygon rotation angle θ that varies between −9.5 degrees and +9.5 degrees, it can be shown that the pitch P of the reflective mode replicated diffraction grating element 12 changes varies little across the reflective mode replicated diffraction grating element 12 but the blazing angle $\delta$ does vary across the reflective mode replicated diffraction grating element 12. Note that this is a first order analysis and a complete analysis may result in higher order terms.

The advantages to using this approach in designing a passive facet tracking system is that it will enable facet tracking for a laser diode source and result in high copy quality. Additionally, there should be cost, size, weight, and scanning speed advantages over current approach.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A rotating polygon having an axis of rotation and at least one reflective facet wherein the improvement comprises each facet having two reflective portions extending across the facet in a direction generally transverse to the axis of rotation, and one portion being a reflective mode diffraction grating wherein the reflective mode diffraction grating is comprised of a plurality of grooves, each groove generally parallel to the axis of rotation, each groove having a pitch distance which separates it from each adjacent groove, and each groove having a blazing angle which defines a depth of each groove.

2. The rotating polygon of claim 1 wherein the pitch distance is substantially the same for the plurality of grooves.

3. The rotating polygon of claim 1 wherein the blazing angle generally increases across at least a portion of the plurality of grooves.

4. The rotating polygon of claim 3 wherein the reflective mode diffraction grating has a center and the blazing angle of said portion substantially varies linearly and increases in a direction away from the center and generally transverse to the axis of rotation.

5. The rotating polygon of claim 1 wherein the reflective mode diffraction grating has a center and two portions extending in opposite directions from the center and generally transverse to the axis of rotation and the blazing angle of each portion generally varies linearly and increases in a direction away from the center and generally transverse to the axis of rotation.

6. The rotating polygon of claim 1 wherein the pitch remains generally constant.

7. A passive facet tracking system comprising:
   A) a rotating polygon having an axis of rotation and at least one reflective facet wherein each facet has two reflective portions extending across the facet in a direction generally transverse to the axis of rotation, wherein one portion is a reflective mode diffraction grating and the other portion is a flat reflective facet,
   B) a reflector,
   C) a lens means with a focal length,
   D) said polygon, said lens means and said reflector being so constructed and arranged relative to each other for said polygon reflective mode diffraction grating facet to reflect a beam along a first path through said lens means to said reflector, said reflector receiving the beam reflected from said polygon reflective mode replicated diffraction grating element and reflecting the beam through a second path through said lens means to said polygon flat facet, and said flat facet reflecting the beam received from said reflector in a post scan direction.

8. The passive facet tracking system of claim 7 wherein said lens means is a dual pass fourier transform lens.

9. The rotating polygon of claim 5 wherein the reflective mode diffraction grating is comprised of a plurality of grooves, each groove generally parallel to the axis of rotation, each groove having a pitch distance which separates it from each adjacent groove, and each groove having a blazing angle which defines a depth of each groove.

10. The rotating polygon of claim 9 wherein the pitch distance is substantially the same for the plurality of grooves.

11. The rotating polygon of claim 9 wherein the blazing angle generally increases across at least a portion of the plurality of grooves.

12. The rotating polygon of claim 11 wherein the reflective mode diffraction grating has a center and the blazing angle of said portion substantially varies linearly and increases in a direction away from the center and generally transverse to the axis of rotation.

13. The rotating polygon of claim 9 wherein the reflective mode diffraction grating has a center and two portions extending in opposite directions from the center and generally transverse to the axis of rotation and the blazing angle of each portion generally varies linearly and increases in a direction away from the center and generally transverse to the axis of rotation.

14. The rotating polygon of claim 9 wherein the pitch remains generally constant.

15. The rotating polygon of claim 9 wherein the blazing angle is substantially defined by $$\delta = |WN/(8\pi F \cos \alpha) - 1|\theta - Wf/(8\pi F \cos \alpha)$$

wherein
  $\delta$ = the blazing angle
  W = a width of the facet
  N = the number of facets
  F = the focal lenth of the lens
  $\alpha$ = a rotation angle of the polygon and
  f = a scan efficiency factor.

* * * * *